Figure 1:
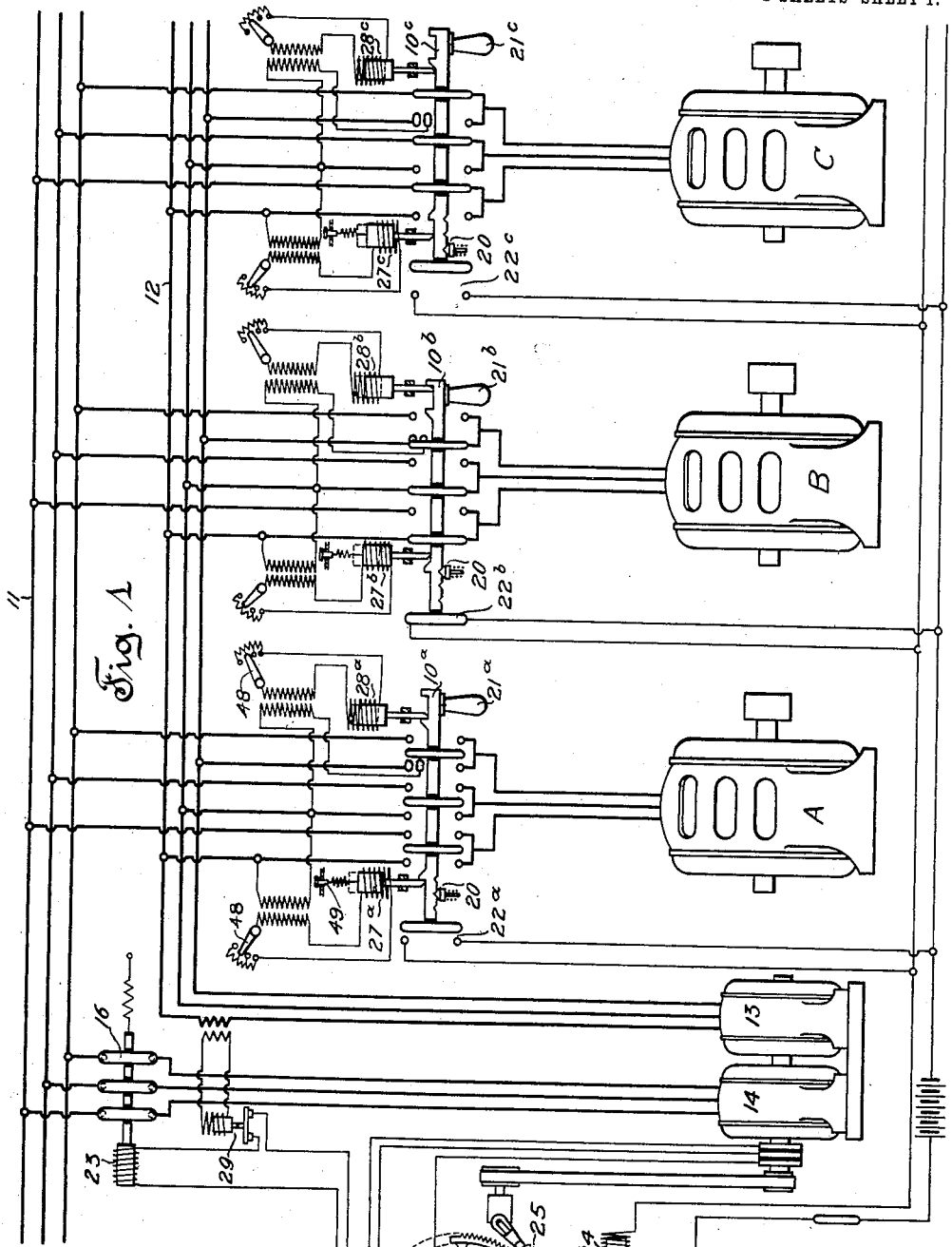

H. W. CHENEY.
MOTOR CONTROL SYSTEM.
APPLICATION FILED SEPT. 30, 1909.

1,030,645.

Patented June 25, 1912.

2 SHEETS—SHEET 2.

Witnesses
Rob. E. Lioll.
John L. Johnson

Inventor
Herbert W. Cheney
By Chas. E. Lord
Attorney

UNITED STATES PATENT OFFICE.

HERBERT W. CHENEY, OF MILWAUKEE, WISCONSIN, ASSIGNOR TO ALLIS-CHALMERS COMPANY, A CORPORATION OF NEW JERSEY.

MOTOR-CONTROL SYSTEM.

1,030,645.  Specification of Letters Patent.  Patented June 25, 1912.

Application filed September 30, 1909. Serial No. 520,331.

*To all whom it may concern:*

Be it known that I, HERBERT W. CHENEY, a citizen of the United States, residing at Milwaukee, in the county of Milwaukee and State of Wisconsin, have invented certain new and useful Improvements in Motor-Control Systems, of which the following is a full, clear, and exact specification.

My invention relates to motor control systems.

The starting apparatus for electric motors is often very expensive, and in most cases separate starting apparatus has been provided for each motor. Where the number of motors is large, this causes the expense of the starting apparatus to be unduly great, especially as very often such apparatus is in use for only a very small part of the time.

It is one object of my present invention to provide a starting apparatus which can be used for a number of motors.

It is found to be more economical to start motors by varying the electro-motive force impressed on the motor circuit than by using resistance to cut down the electro-motive force impressed on a motor connected to a supply circuit of suitable electro-motive force for running conditions. This is accomplished in accordance with my present invention by connecting a motor to be started to a generator which is at rest or substantially so, and increasing the speed of the generator until the electro-motive force thereof reaches a value approximating that suitable for the running conditions of the motor; then the motor connections are preferably transferred from such generator to a main source of electro-motive force suitable for running conditions. This is the ideal way of starting induction motors and other A. C. motors, for it gradually increases from zero the value and frequency of the electromotive force impressed thereon.

The various novel features of my invention will appear from the description and drawings and will be particularly pointed out in the claims.

The two figures of the drawings show diagrammatically two motor control systems embodying my invention.

The motors A, B, and C are the motors to be controlled. These motors, of which there may be any desired number, are here illustrated as three-phase induction motors of the squirrel cage type, though for some features of my invention the motors may be either alternating or direct current motors of any desired type. By means of double throw switches $10^a$, $10^b$, $10^c$, one for each motor, the motors may be connected either to a main supply circuit 11 or to an auxiliary supply circuit 12. The circuit 11, which may be supplied from any desired source, has an electro-motive force of substantially constant value and frequency. The circuit 12 is supplied by a variable speed generator 13 driven in any desired manner, but preferably by a variable speed electric motor 14. In the arrangements illustrated the motor 14 is an induction motor of the wound rotor type with a variable resistance 15 in its rotor circuit, and is supplied from the main supply circuit 11 through a switch 16. In order to start any of the motors A, B, C, the motor is first connected to the supply circuit 12 by means of the proper switch $10^a$, $10^b$, or $10^c$ while the generator 13 is at rest or substantially so, the switch 16 is closed and the motor 14 and generator 13 caused to increase in speed by gradually cutting out the resistance 15 in the rotor circuit of the motor 14, thus increasing both the value and frequency of the electro-motive force impressed on the motor A, B, or C which is being started; and when the value and frequency of such electro-motive force are substantially up to those of the electro-motive force of the circuit 11 the switch $10^a$, $10^b$, or $10^c$ is thrown to its other closed position to disconnect the motor from the supply circuit 12 and connect it to the main supply circuit 11 for normal running.

In simple installations, as for instance where there is but one motor to be started, the operations above described may all be produced manually. But in most cases, especially when there are a number of motors to be started by the same starting motor-generator set 14—13, it is desirable to provide a greater or less number of automatic features and interlocking devices so that the starting operation may safely be effected by unskilled operators. The two figures of the drawing show two substantially fool-proof systems.

In the arrangement shown in Figure 1, when any motor, say A, is at rest, its control switch, say 10ª, is in its middle position as illustrated. Each motor-control switch is provided with a detent 20 which holds it against accidental displacement from any one of its three positions. In order to start any motor, say B, its control switch, say 10ᵇ, by means of its handle 21ᵇ, is manually moved to the left to connect the motor B to the auxiliary supply circuit 12, such movement being allowed for any of the motor-control switches as long as the generator 13 is at or near a stand-still. The movement of the switch 10ᵇ to the left closes the auxiliary switch 22ᵇ to energize the solenoids 23 and 24. The energization of the solenoid 23 causes the closure of the switch 16, which is biased to open position, and the energization of the solenoid 24 causes the worm 25 to be moved into engagement with its coöperating gear 26. The motor 14 now starts with the entire resistance 15 in its rotor circuit, and the generator 13 generates an electro-motive force of low value and frequency. As the motor 14 rotates, it drives the worm gear 25—26 to cut resistance 15 out of its rotor circuit, thus causing the motor generator 14—13 to increase in speed and increase the value and frequency of the electro-motive force impressed on the motor B. As soon as the electro-motive force of the generator 13 has reached a substantial value, the several solenoids 27ª, 27ᵇ, 27ᶜ, move their cores downward to lock against movement to the left position all the switches 10ª, 10ᵇ, 10ᶜ not already in such position. As shown in Fig. 1, the switch 10ᵇ is in its left position for the starting of the motor B, while the switches 10ª and 10ᶜ are locked against movement to the left position. When the motor generator 14—13 has gained a speed sufficient to bring the electro-motive force of the generator 13 to a predetermined value, preferably substantially equal to that of the electro-motive force of the main supply circuit 11, the solenoid 28ᵇ lifts its core so that the operator may move the switch 10ᵇ to the right to transfer the motor B from the starting supply circuit 12 to the main supply circuit 11. Previous to that time it would have been impossible to have moved this switch to this position, although it was at all times possible to move it to its middle or off position. Only the solenoid 28ᵇ of the switch 10ᵇ, which alone of the switches was in its left hand or starting position, is thus energized, the corresponding solenoids 28ª and 28ᶜ of the other motor-control switches remaining deënergized to prevent movement to right hand position of any switch not in its left hand position. This selective energization of the solenoids 28ª, 28ᵇ, 28ᶜ is obtained by arranging auxiliary contacts on the motor-control switches 10ª, 10ᵇ, or 10ᶜ, so that only when any such switch is in its left hand position is the primary circuit of the supplying transformer of the corresponding solenoid complete. Upon the movement of the switch 10ᵇ out of its left hand position, the auxiliary switch 22ᵇ is opened to deënergize the solenoids 23 and 24 and thus to allow the switch 16 to open and the rheostat 15 to be moved back by its returning spring to highest resistance position. The gear segment 26 has one part unprovided with teeth, into which the worm 25 runs when the rheostat has been moved into its no-resistance position, so that in case the operator does not move his motor-control switch away from its left hand position as soon as the electro-motive force of the generator 13 has reached the proper value the rheostat will not go beyond such no-resistance position. The motor C is shown connected for normal running, its switch 10ᶜ being in right hand position to connect the motor to the main supply circuit 11. The detents which coöperate with the solenoids 27ª, 27ᵇ, 27ᶜ and 28ª, 28ᵇ, 28ᶜ are so shaped that the motor-control switches may be moved at any time from either extreme position to middle position. If desired, a switch 29 responsive to the current supplied by the generator 13 may be provided in the circuit of the solenoids 23 and 24. This switch acts to cause the switch 16 to open upon an overload on the generator 13 and to stay open during the continuance of such overload.

By the arrangement illustrated all the motors can be started by the same starting apparatus, it being necessary for any operator only first to move his motor-control switch to the left, and when the proper time arrives to move it to the right. He is unable to move his motor-control switch to the right until predetermined conditions obtain, and he is unable to move it to the left if the starting apparatus is being used to start another motor and the electro-motive force of the generator 13 has reached a substantial value. He can stop his motor at any time by moving his motor control switch to middle position.

Figure 2:
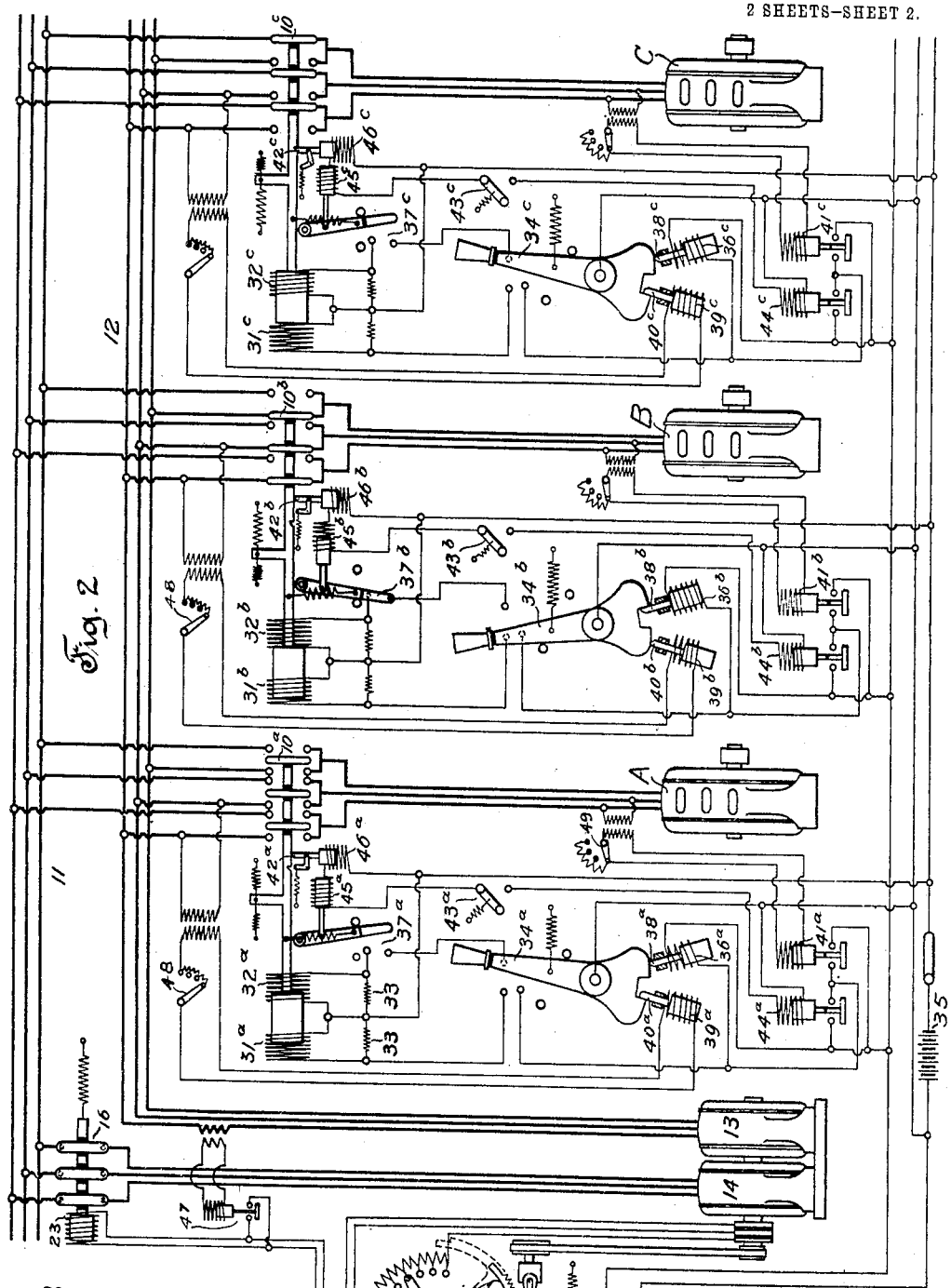

In the arrangement shown in Fig. 2 the switches 10ª, 10ᵇ, 10ᶜ are biased to middle or off position, and are movable to left or starting position by solenoids 31ª, 31ᵇ, 31ᶜ respectively and to right or running position by solenoids 32ª, 32ᵇ, 32ᶜ. A resistance 33 may be connected across each of these solenoids to diminish the sparking at the opening of the circuits of such solenoids. The connections for the motor A are shown with the motor at rest, for the motor B with the motor starting, and for the motor C with the motor running under normal conditions. When any motor is at rest, its hand operated starting lever 34ª, 34ᵇ, or 34ᶜ is in its right hand position, as the lever 34ª is shown, to which position these levers are biased. In order to start any motor, the starting lever used, say 34ᵇ, is moved to its left hand position as shown, thus completing a circuit from any desired source of current such as a battery 35, through the solenoids 23, 24, 36ᵇ and 31ᵇ. Such movement of any starting lever to its starting position is always allowable if the generator 13 is at rest. The solenoid 31ᵇ, when energized, moves the switch 10ᵇ to the left to connect the motor B to the starting circuit 12, and the latter part of this movement of the switch 10ᵇ closes the switch 37ᵇ in the circuit of the solenoid 32ᵇ. The solenoid 36ᵇ, when energized, moves a lock 38ᵇ into engagement with the starting lever 34ᵇ to hold such lever in starting position against the action of its returning spring. The solenoid 24, when energized, moves the worm 25 into engagement with the gear 26, and the solenoid 23, when energized, closes the switch 16, as in the arrangement shown in Fig. 1. The motor generator set 14—13 now starts, and an electro-motive force of low value and frequency is impressed on the motor B. The speed of the motor generator set 14—13 gradually increases as the resistance 15 in the rotor circuit of the motor 14 is cut out, and this increase in speed increases the value and frequency of the electro-motive force impressed on the motor B until they obtain substantial equality with those of the electro-motive force of the main supply circuit 11. As soon as the electro-motive force of the generator 13 reaches a substantial value, the several solenoids 39ª, 39ᵇ, 39ᶜ, are energized to lift the locks 40ª, 40ᵇ, 40ᶜ of those of the starting levers 34ª, 34ᵇ, 34ᶜ which are not in left hand position, to lock such starting levers against being moved to such left hand position. Thus the starting lever of any motor cannot be moved to starting position to cause the starting of its associated motor if the generator 13 is being used to start another motor and the electro-motive force of such generator has reached a substantial value. When the electro-motive force supplied by the generator 13 and impressed on the motor B reaches a predetermined value, preferably its maximum value, and one substantially equal to that of the E. M. F. of the main circuit 11, the solenoid 41ᵇ lifts its switch and short-circuits the solenoid 36ᵇ. The resultant deënergization of the solenoid 36ᵇ releases the lock 38ᵇ, and causes the starting lever 34ᵇ to move to the right to complete the circuit of the solenoid 32ᵇ, which immediately moves the switch 10ᵇ to the right to disconnect the motor B from the starting circuit 12 and connect it to the running circuit 11. The switch 10ᵇ is held in this position by the lock 42ᵇ, for the last part of the movement of the switch 10ᵇ to the right opens the switch 37ᵇ to deënergize the solenoid 32ᵇ. The moving of the starting lever 34ᵇ from its left hand position deënergizes the solenoids 31ᵇ, 24, and 23, the deënergization of the first permitting the solenoid 32ᵇ to do its work, that of the second causing the disengagement of the worm 25 and gear 26 to allow the rheostat 15 to be returned by its spring to its high resistance position, and that of the third causing the opening of the switch 16 to stop the motor 14. When the motor generator set 14—13 has come substantially to rest, the solenoids 39ª, 39ᵇ, 39ᶜ drop the locks 40ª, 40ᵇ, 40ᶜ so that any of the starting levers may be moved to left hand position if desired. But if any starting lever, say 34ᶜ, whose motor is connected for normal running, as is the motor C, is moved to its left position, the lock 42ᶜ will prevent the switch 10ᶜ from moving out of its right hand or running position. In order to stop any motor, say C, which is running, a push button 43ᶜ is closed to energize solenoids 44ᶜ, 45ᶜ, and 46ᶜ. The solenoid 44ᶜ, when energized, closes a switch to short-circuit the solenoid 36ᶜ to release the lock 38ᶜ and allow the starting switch 34ᶜ to move to the right and the switch 10ᶜ to move to middle or off position if the motor C is still connected to the starting circuit. The solenoid 45ᶜ, when energized, opens the switch 37ᶜ, if it is not already open, to prevent the energization of the solenoid 32ᶜ by a movement of the starting lever 34ᶜ to the right. The solenoid 46ᶜ, when energized, releases the lock 42ᶜ and allows the switch 10ᶜ to move to middle or off position. Thus the depression of the push button 43ᶜ causes the switch 10ᶜ to move to its middle or off position whether it formerly occupied its right hand or running position or its left hand or starting position. An overload switch 47 responsive to the current supplied by the generator 13 may be arranged, when lifted because of such an overload, to short-circuit the solenoid 23 and cause the switch 16 to open and stay open during the continuance of such overload.

The various solenoids, switches, locks, etc., described above may all be adjustable if desired, as by rheostats in the solenoid circuits and adjustable springs on the switches and locks. For instance, rheostats such as 48 may be placed in the circuits of the solenoids 27ª, 28ª, 39ª, 41ª, etc., and adjusting screws such as 49 provided for adjusting the springs for the locks controlled by the solenoids 27ª, etc.

Many modifications may be made in the precise arrangements shown and described, and all such which do not involve a departure from the spirit and scope of my invention I aim to cover in the following claims.

What I claim as new is:

1. In combination, a motor, a source of constant electro-motive force, a source of variable electro-motive force, means for preventing the motor from being connected to the second source if the value of the electro-motive force thereof exceeds a predetermined value, and means for first connecting the motor to the source of variable electro-motive force, raising the electro-motive force of such source until it is substantially equal to the electro-motive force of the source of constant electro-motive force, and disconecting the motor from the source of variable electro-motive force and connecting it to the source of constant electro-motive force, and for requiring the operation to be in that order.

2. In combination, an electric motor, a source of constant electro-motive force, a source of variable electro-motive force, means for varying the electro-motive force of said second source from a minimum to a value substantially equal to that of the source of constant electro-motive force, means for connecting the motor to either of said sources, and means for preventing the motor from being connected to the source of constant electro-motive force until after it has been connected to the source of variable electro-motive force.

3. In combination, an electric motor, a source of constant electro-motive force, a source of variable electro-motive force, means for varying the electro-motive force of said second source from a minimum to a value substantially equal to that of the source of constant electro-motive force, means for connecting the motor to either of said sources, and means for preventing the motor from being connected to the source of constant electro-motive force until after it has been connected to the source of variable electro-motive force and the value of the electro-motive force of said last mentioned source has been brought substantially up to the value of the electro-motive force of said source of constant electro-motive force.

4. In combination, an electric motor, a source of constant electro-motive force, a source of variable electro-motive force, means for varying the electro-motive force of said second source from a minimum to a value substantially equal to that of the source of constant electro-motive force, means for connecting the motor to either of said sources, means for preventing the motor from being connected to the source of constant electro-motive force until after it has been connected to the source of variable electro-motive force, and means for preventing the motor from being connected to said source of variable electro-motive force if the electro-motive force of said source exceeds a predetermined value.

5. In combination, an electric motor, a source of constant electro-motive force, a source of variable electro-motive force, means for varying the electro-motive force of said second source from a minimum to a value substantially equal to that of the source of constant electro-motive force, means for connecting the motor to either of said sources, and means for preventing the motor from being connected to said source of variable electro-motive force if the electro-motive force of said source exceeds a predetermined value.

6. In combination, an electric motor, a source of constant electro-motive force, a source of variable electro-motive force, means for varying the electro-motive force of said second source from a minimum to a value substantially equal to that of the source of constant electro-motive force, means for connecting the motor to either one of said sources, means for preventing the motor from being connected to the source of constant electro-motive force until after it has been connected to the source of variable electro-motive force and the value of the electro-motive force of said last mentioned source has been brought substantially up to the value of the electro-motive force of said source of constant electro-motive force, and means for preventing the motor from being connected to said source of variable electro-motive force if the electro-motive force of said source exceeds a predetermined value.

7. In combination, a plurality of electric motors, a source of constant electro-motive force, a source of variable electro-motive force, means for connecting any of said motors to either of said sources, and means for preventing any motor from being connected to the source of constant electro-motive force until after it has been connected to the source of variable electro-motive force.

8. In combination, an alternating current motor, a source of electromotive force of constant frequency, a source of electromotive force of variable frequency, means for varying the frequency of said second source from a minimum to a value substantially equal to that of the first source, means for connecting the motor to either of said sources, and means for preventing the motor from being connected to the first source until after it has been connected to the second source.

9. In combination, an alternating current motor, a source of electromotive force of constant frequency, a source of electromotive force of variable frequency, means for varying the frequency of said second source from a minimum to a value substantially equal to that of the first source, means for connecting the motor to either of said sources, and means for preventing the motor from being connected to the first source until after it has been connected to the second source and the frequency of said second source has been brought into substantial equality with that of the first.

10. In combination, an alternating current motor, a source of electromotive force of constant frequency, a source of electromotive force of variable frequency, means for varying the frequency of said second source from a minimum to a value substantially equal to that of the first source, means for connecting the motor to either of said sources, and means for preventing the motor from being connected to the second source if the frequency of the latter exceeds a predetermined value.

11. In combination, an alternating current motor, a source of electromotive force of constant frequency, a source of electromotive force of variable frequency, means for varying the frequency of said second source from a minimum to a value substantially equal to that of the first source, means for connecting the motor to either of said sources, means for preventing the motor from being connected to the second source if the frequency of the latter exceeds a predetermined value, and means for preventing the motor from being connected to the first source until after it has been connected to the second source.

12. In combination, an alternating current motor, a source of electromotive force of constant frequency, a source of electromotive force of variable frequency, means for varying the frequency of said second source from a minimum to a value substantially equal to that of the first source, means for connecting the motor to either of said sources, means for preventing the motor from being connected to the second source if the frequency of the latter exceeds a predetermined value, and means for preventing the motor from being connected to the first source until after it has been connected to the second source and the frequency of said second source has been brought into substantial equality with that of the first.

13. In combination, an alternating current motor, a source of electromotive force of constant value and frequency, a source of electromotive force of variable value and frequency, means for connecting the motor to either of said sources, and means for preventing the motor from being connected to the first source until it has been connected to the second.

14. In combination, an alternating current motor, a source of electromotive force of constant value and frequency, a source of electromotive force of variable value and frequency, means for connecting the motor to either of said sources, and means for preventing the motor from being connected to the first source until it has been connected to the second and the value and frequency of the electromotive force of said second source has been brought into substantial equality with those of the first.

15. In combination, an alternating current motor, a source of electromotive force of constant value and frequency, a source of electromotive force of variable value and frequency, means for connecting the motor to either of said sources, and means for preventing the motor from being connected to the second source if the value of the electromotive force thereof exceeds a predetermined value.

16. In combination, an alternating current motor, a source of electromotive force of constant value and frequency, a source of electromotive force of variable value and frequency, means for connecting the motor to either of said sources, means for preventing the motor from being connected to the second source if the value of the electromotive force thereof exceeds a predetermined value, and means for preventing the motor from being connected to the first source until after it has been connected to the second.

17. In combination, an alternating current motor, a source of electromotive force of constant value and frequency, a source of electromotive force of variable value and frequency, means for connecting the motor to either of said sources, means for preventing the motor from being connected to the second source if the value of the electromotive force thereof exceeds a predetermined value, and means for preventing the motor from being connected to the first source until after it has been connected to the second and the value and frequency of the electromotive force of said second source has been brought into substantial equality with those of the first.

18. In combination, an electric motor, a source of constant electromotive force, a source of variable electromotive force, the electromotive force of which is variable between zero and substantial equality with that of the source of constant electromotive force, means for preventing the motor from being connected to the second source if the value of the electromotive force thereof exceeds a predetermined value, and means controlled by a single manual operation for first connecting the motor to the source of variable electromotive force, then raising the electromotive force of said source to substantial equality with that of the other source, and then transferring the motor from its connection to the source of variable electromotive force to connection with the source of constant electromotive force, and for requiring the operation to take place in that order.

19. In combination, an electric motor, a source of constant electromotive force, a source of variable electromotive force, the electromotive force of which is variable between zero and substantial equality with that of the source of constant electromotive force, means controlled by a single manual operation for first connecting the motor to the source of variable electromotive force, then raising the electromotive force of said source to substantial equality with that of the other source, and then transferring the motor from its connection to the source of variable electromotive force to connection with the source of constant electromotive force, and means for preventing the commencement of the operation of the aforesaid means while the electromotive force of said source of variable electromotive force exceeds a predetermined value.

20. In combination, an electric motor, a source of constant electromotive force, a motor generator set, means for connecting the motor of said motor generator set to said source, means for varying the speed of said motor generator set, means for connecting the first-named motor either to the generator of the motor generator set or to said source, and means for preventing said first-named motor from being connected to said source until after it has been connected to said generator.

21. In combination, an electric motor, a source of constant electromotive force, a motor generator set, means for connecting the motor of said motor generator set to said source, means for varying the speed of said motor generator set, means for connecting the first named motor either to the generator of the motor generator set or to said source, and means for preventing said first-named motor from being connected to said source until after it has been connected to said generator and the speed of said motor generator set has been brought to a predetermined value.

22. In combination, an electric motor, a source of constant electromotive force, a motor generator set, means for connecting the motor of said motor generator set to said source, means for varying the speed of said motor generator set, means for connecting the first-named motor either to the generator of the motor generator set or to said source, and means for preventing said first-named motor from being connected to said generator if the speed of said motor generator set exceeds a predetermined value.

23. In combination, an electric motor, a source of constant electromotive force, a motor generator set, means for connecting the motor of said motor generator set to said source, means for varying the speed of said motor generator set, means for connecting the first-named motor either to the generator of the motor generator set or to said source, means for preventing said first-named motor from being connected to said generator if the speed of said motor generator set exceeds a predetermined value, and means for preventing said first-named motor from being connected to said source until after it has been connected to said generator.

24. In combination, an electric motor, a source of constant electromotive force, a motor generator set, means for connecting the motor of said motor generator set to said source, means for varying the speed of said motor generator set, means for connecting the first-named motor either to the generator of the motor generator set or to said source, means for preventing said first-named motor from being connected to said generator if the speed of said motor generator set exceeds a predetermined value, and means for preventing said first-named motor from being connected to said source until after it has been connected to said generator and the speed of said motor generator set has been brought to a predetermined value.

25. In combination, an electric motor, a source of constant electromotive force, a motor generator set, means for connecting the motor of said motor generator set to said source, means for varying the speed of said motor generator set, means for connecting the first-named motor either to the generator of the motor generator set or to said source, and unitary means for controlling all the aforesaid means.

26. In combination, a plurality of electric motors, a source of constant electromotive force, a source of variable electromotive force, the electromotive force of which is normally zero but may be raised to substantial equality with that of the source of constant electromotive force, means for connecting any of the motors to either of said sources and for raising the electromotive force of said source of variable electromotive force, and means for preventing any motor from being connected to said source of variable electromotive force unless the electromotive force thereof is substantially zero.

27. In combination, a plurality of electric motors, a source of constant electromotive force, a source of variable electromotive force, the electromotive force of which is normally zero but may be raised to substantial equality with that of the source of constant electromotive force, means for connecting any of the motors to either of said sources and for raising the electromotive force of said source of variable electromotive force, and means for preventing the motor from being connected to the source of constant electromotive force until after it has been connected to the source of variable electromotive force.

28. In combination, a plurality of motors, a source of constant electromotive force, a generator, means for varying the speed of the generator, means for connecting any motor either to said generator or to said source of constant electromotive force, and means for preventing any motor from being connected to said generator if the speed of the latter exceeds a predetermined value.

29. In combination, a motor, a source of constant electromotive force, a variable speed generator, means for connecting said motor either to said generator or to said source of constant electromotive force, and means controlled by the connection of said motor to said generator for causing the latter to increase in speed.

30. In combination, a motor, a source of constant electromotive force, a variable speed generator, means for connecting said motor either to said generator or to said source of constant electromotive force, means controlled by the connection of said motor to said generator for causing the latter to increase in speed, and means for preventing the motor from being connected to the generator if the speed of the latter exceeds a predetermined value.

31. In combination, a motor, a source of constant electromotive force, a variable speed generator, means for connecting said motor either to said generator or to said source of constant electromotive force, means controlled by the connection of said motor to said generator for causing the latter to increase in speed, and means for preventing the motor from being connected to said source of constant electromotive force until after it has been connected to the generator and the speed of the latter has attained a predetermined value.

Milwaukee, Wis., Sept. 15, 1909.

In testimony whereof I affix my signature, in the presence of two witnesses.

HERBERT W. CHENEY.

Witnesses:
　G. B. Schley,
　Chas. L. Byron.